(12) United States Patent
Sommer et al.

(10) Patent No.: US 9,469,271 B2
(45) Date of Patent: Oct. 18, 2016

(54) KNEE AIRBAG

(71) Applicant: Autoliv Development AB, Vårgårda (SE)

(72) Inventors: Karl-Heinz Sommer, Stockdorf (DE); Marc Schock, Karlsfeld (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/769,359

(22) PCT Filed: Feb. 27, 2014

(86) PCT No.: PCT/EP2014/053795
§ 371 (c)(1),
(2) Date: Aug. 20, 2015

(87) PCT Pub. No.: WO2014/131818
PCT Pub. Date: Sep. 4, 2014

(65) Prior Publication Data
US 2016/0001734 A1    Jan. 7, 2016

(30) Foreign Application Priority Data
Feb. 27, 2013    (DE) .......... 10 2013 003 239

(51) Int. Cl.
*B60R 21/233* (2006.01)
*B60R 21/2338* (2011.01)
(Continued)

(52) U.S. Cl.
CPC .......... *B60R 21/233* (2013.01); *B60R 21/2338* (2013.01); *B60R 2021/2395* (2013.01); *B60R 2021/23169* (2013.01); *B60R 2021/23324* (2013.01)

(58) Field of Classification Search
CPC ............ B60R 21/233; B60R 21/2338; B60R 2021/2395; B60R 2021/23324; B60R 2021/23169
See application file for complete search history.

(56) References Cited

U.S. PATENT DOCUMENTS

| 4,290,627 A | * | 9/1981 | Cumming ............. B60R 21/233 280/729 |
|---|---|---|---|
| 4,300,894 A | | 11/1981 | Cumming et al. |
| 5,048,863 A | | 9/1991 | Henseler et al. |

(Continued)

FOREIGN PATENT DOCUMENTS

| CN | 101011957 A | 8/2007 |
|---|---|---|
| DE | 298 07 424 U1 | 10/1998 |

(Continued)

OTHER PUBLICATIONS

PCT International Search Report—May 26, 2014.
(Continued)

*Primary Examiner* — Darlene Condra
(74) *Attorney, Agent, or Firm* — Brinks Gilson & Lione

(57) ABSTRACT

A knee airbag having an inlet opening (6) for deployment gas from a gas generator (4) for flowing into a first chamber (10), at least one second chamber (20, 30) adjacent to the first chamber (10), which second chamber (20, 30) is separated from the first chamber by at least one dividing wall (25), wherein between the first chamber (10) and the second chamber (20, 30) at least one closable overflow opening (40) is provided, through which deployment gas can flow from the first chamber (10) into the second chamber (20, 30), wherein at least one closing device (50 for the overflow opening (40), or the overflow opening (40), is associated with the penetration region of the knees (5).

11 Claims, 4 Drawing Sheets

(51) Int. Cl.
*B60R 21/231* (2011.01)
*B60R 21/239* (2006.01)

(56) References Cited

U.S. PATENT DOCUMENTS

| | | | |
|---|---|---|---|
| 5,333,903 A | 8/1994 | Eyrainer et al. | |
| 5,458,366 A | 10/1995 | Hock et al. | |
| 5,639,118 A | 6/1997 | Rhule et al. | |
| 5,647,609 A | 7/1997 | Spencer et al. | |
| 6,155,595 A * | 12/2000 | Schultz | B60R 21/233 280/729 |
| 6,428,042 B1 | 8/2002 | Fischer et al. | |
| 6,685,217 B2 | 2/2004 | Abe | |
| 7,434,837 B2 | 10/2008 | Hotta et al. | |
| RE42,364 E * | 5/2011 | Hayakawa | B60R 21/206 280/740 |
| 7,963,550 B2 | 6/2011 | Hong et al. | |
| 8,393,638 B2 | 3/2013 | Gottschalk et al. | |
| 2003/0030255 A1 | 2/2003 | Igawa et al. | |
| 2003/0120409 A1 | 6/2003 | Takimoto et al. | |
| 2003/0193174 A1 | 10/2003 | Abe | |
| 2005/0151351 A1 | 7/2005 | Enders et al. | |
| 2005/0230941 A1 | 10/2005 | Takimoto et al. | |
| 2006/0108780 A1 | 5/2006 | Hotta et al. | |
| 2007/0126212 A1 | 6/2007 | Takimoto et al. | |
| 2007/0182134 A1 | 8/2007 | Mizuno et al. | |
| 2007/0200320 A1 | 8/2007 | Keshavaraj | |
| 2007/0200321 A1 * | 8/2007 | Heitplatz | B60R 21/206 280/730.1 |
| 2009/0134611 A1 | 5/2009 | Wigger | |
| 2009/0184498 A1 | 7/2009 | Takimoto et al. | |
| 2011/0175334 A1 * | 7/2011 | Miller | B60R 21/206 280/730.2 |
| 2013/0020788 A1 * | 1/2013 | Spahn | B60R 21/23 280/730.1 |
| 2014/0125039 A1 * | 5/2014 | Abele | B60R 21/239 280/730.1 |
| 2015/0151709 A1 * | 6/2015 | Anderson | B60R 21/239 280/729 |
| 2015/0197211 A1 * | 7/2015 | Tanaka | B60R 21/206 280/729 |

FOREIGN PATENT DOCUMENTS

| | | |
|---|---|---|
| DE | 203 07 535 U1 | 10/2003 |
| DE | WO 2005/070729 A1 | 8/2005 |
| DE | 10 2004 018 665 A1 | 12/2005 |
| DE | 10 2005 037 845 A1 | 6/2006 |
| DE | 20 2006 005 872 U1 | 7/2006 |
| DE | 603 05 374 T2 | 5/2007 |
| DE | 10 2007 000 069 A1 | 8/2007 |
| DE | 10 2006 013 287 A1 | 9/2007 |
| DE | 10 2006 051 218 A1 | 11/2007 |
| DE | 10 2006 040 177 A1 | 2/2008 |
| DE | 602 33851 D1 | 11/2009 |
| DE | 10 2008 029 655 A1 | 12/2009 |
| DE | 10 2010 026 933 B4 | 2/2013 |
| EP | 0 773 144 B1 | 3/2000 |
| EP | 1 310 408 A2 | 5/2003 |
| EP | 1 354 771 A1 | 10/2003 |
| EP | 1 508 485 A1 | 2/2005 |
| EP | 1 300 299 B1 | 11/2006 |
| EP | 1 816 038 B1 | 5/2008 |
| EP | 2 110 285 A2 | 10/2009 |
| EP | WO 2012/167908 A1 | 12/2012 |
| JP | 2003-182504 | 7/2003 |
| JP | 2003-226218 | 8/2003 |
| JP | 2007-203937 | 8/2007 |
| JP | 2008-155888 | 7/2008 |
| JP | 2010-006333 | 1/2010 |
| JP | 2004-330959 | 11/2010 |
| KR | 10-2003-0050611 | 6/2003 |
| KR | 10-2005-0093843 | 9/2005 |

OTHER PUBLICATIONS

German Examination Report—Nov. 15, 2014.

* cited by examiner

KNEE AIRBAG

CROSS REFERENCE TO RELATED APPLICATIONS

This application claims priority to German Patent Application No. 10 2013 003 239.2 filed on Feb. 27, 2013 and PCT International Patent Application No. PCT/EP2014/053795, filed on Feb. 27, 2014.

FIELD OF THE INVENTION

The invention relates to a knee airbag having an inlet opening for deployment gas from a gas generator for flowing into a first chamber, at least one second chamber adjacent to the first chamber, in which the second chamber is separated from the first chamber by at least one dividing wall, wherein at least one closable overflow opening is provided between the first chamber and the second chamber, through which overflow opening deployment gas can flow from the first chamber into the second chamber.

Knee airbags are knee protection devices, which can be used both in the driver area and in the front passenger area. They are used to protect the occupants in the event of a frontal accident and have, on the one hand, the function of preventing a contact of the knee region and of the shins with the instrument panel, and, in addition, maintain the seating position of the occupants. For this purpose, it is provided that deployment gas is introduced from a gas generator and the knee airbag normally deploys out of the footwell from below in front of the instrument panel.

Airbags are normally divided into chambers that are more or less distinctly separated from each other in order to achieve the best possible positioning along the outer contour of the instrument panel. As a rule, the chambers located directly in the region of the instrument panel have the highest pressure peaks, and serve to position the knee airbag and hold it in the desired position. A direct contact with body parts, in particular with knees or shins, exists only in a limited circumference.

In the event of a frontal collision, the occupant is immersed with the knees into the already positioned knee airbag. Initially, the volume is reduced in the immediate area of immersion of the knee or shins, and with delay also in the airbag chambers located underneath, which causes a pressure increase. In the case of an accident, the deployment gas escapes from the area of direct interaction between the knees and the knee airbag to areas that are of secondary importance for retention. In order to nevertheless limit the penetration depth of the knee as desired, a higher gas generator power is required that in turn, causes higher pressure peaks inside the lower, first chambers, which can lead to integrity problems of the airbag material.

DE 10 2008 029 655 A1 relates to a knee protection device for vehicle occupants wherein the airbag includes at least one upper and one lower chamber arrangement which are fluidically connected to each other. A valve is arranged between the upper and the lower chamber arrangement, which allows the deployment gas to flow into the upper chamber arrangement, but blocks a backflow from the upper chamber arrangement into the lower chamber arrangement.

The object of the present invention is to provide a knee airbag, by means of which, on the one hand, a rapid deployment and filling of the chambers near the knees can be achieved, and, on the other hand, does not require increased gas generator pressures.

This object is inventively attained by a knee airbag having the features described herein; advantageous embodiments and further developments of the invention are disclosed in the in the description, and in the figures.

SUMMARY

The knee airbag having an inflow opening for deployment gas from a gas generator for flowing into a first chamber, at least one second chamber adjacent to the first chamber, in which the second chamber is divided from the first chamber by at least one dividing wall, wherein at least one closable overflow opening is provided between the first chamber and the second chamber, through which overflow opening the deployment gas can flow from the first chamber into the second chamber, provides that at least one closing device for the overflow opening, or the overflow opening, is associated with the penetration region of the knees. It is thereby possible that the overflow opening can be mechanically closed by the penetration of the knees, as a result of which backflow of deployment gas from the chamber near the knees is prevented. The change in volume due to the penetrating knees causes a pressure increase, wherein the deployment gas cannot escape the chamber from the area near the knees due to the closure of the overflow opening by the knees. As a result, there is an effective support of the knee region by the closed chamber or the closed chambers. As long as there is as yet no knee contact with the knee airbag, the filling of the chambers is undisturbed, whereby the gas generator pressure can be held at a low level without having to reduce the functionality of the support.

The closing device can be configured as part of the airbag, as part of a catch strap (or tether), or as a dividing wall bushing in order to thus mechanically block in a simple manner the overflow opening in the event of knee contact or in the event of a defined penetration of the knee or of the knees into the second chamber. It is also possible to provide a plurality of catch straps instead of only one catch strap, which upon penetration of the knees into the second chamber cause the overflow opening to be closed or to close.

The closing device can have at least one catch strap, which in the filled, uninfluenced state of the knee airbag, opens the overflow opening; this effect is, however, cancelled with the penetration of the knee into the knee airbag and the deformation of the second chamber, and consequently the overflow opening is closed. The closing device thus does not actively close the overflow opening, but rather makes it possible for the closing device to close the overflow opening, for example, due to the pressure inside the chamber or to a cancelled blocking effect, which necessarily keeps the overflow opening open.

A further development of the invention provides that a closing device is associated with both penetration regions of the knees into the knee airbag, so that it is possible to individually influence the overflow opening or the overflow openings by the penetration of one or both knees.

A variant of the invention provides that the first and/or successive chambers in the flow direction form partial chambers divided from one another, which are filled separately as they are each provided with an overflow opening so that a fluidic connection between the successive chambers is possible. It is thereby possible to further ensure the filling of a partial chamber even if an overflow opening in the adjacent partial chamber is already closed, for example, due to an offset penetration of a knee, or in the case of a so-called out-of-position accident, during which the vehicle occupant is not located in the expected conventional position.

The closing device can have a first tensioning device, which is under tension in the filled state of the knee airbag and keeps the overflow opening open, wherein a second tensioning device is associated with the overflow opening, which second tensioning device acts against the first tensioning device so that in the state during which the outflow opening is not loaded by the knees, and the overflow openings are kept open. If the first tensioning device, for example the catch straps, is no longer under tension, the second tensioning device causes the closure of the overflow opening and thus a fluidic blocking of the second chamber. This can occur, for example, by a length-matched arrangement of catch straps, wherein relatively short catch straps open an overflow opening. If, during a volume reduction of the chamber, these first catch straps are moved in the direction of the overflow opening, the overflow opening closes and the second catch straps or tensioning straps are tensed by the change in the geometry of the chamber and close the overflow opening.

The first and second tensioning devices can thus be configured as catch straps; alternatively, it is possible that the second tensioning device can be formed by attaching dividing wall sections to the walls of the airbag in order to achieve the effect described above.

The first chamber is advantageously arranged in the direction of gravity below, the second chamber or below the other chambers in order to achieve a positioning and support of those chambers which are in contact with the knees or shins.

In the penetration region of the knees, a section having overflow openings or an overflow tube can be arranged in the dividing wall, which overflow openings or overflow tube is closable by the penetrating knees.

BRIEF DESCRIPTION OF THE DRAWINGS

Exemplary embodiments of the invention are explained below in more detail with reference to the attached figures, which show.

DETAILED DESCRIPTION

Figure 1:
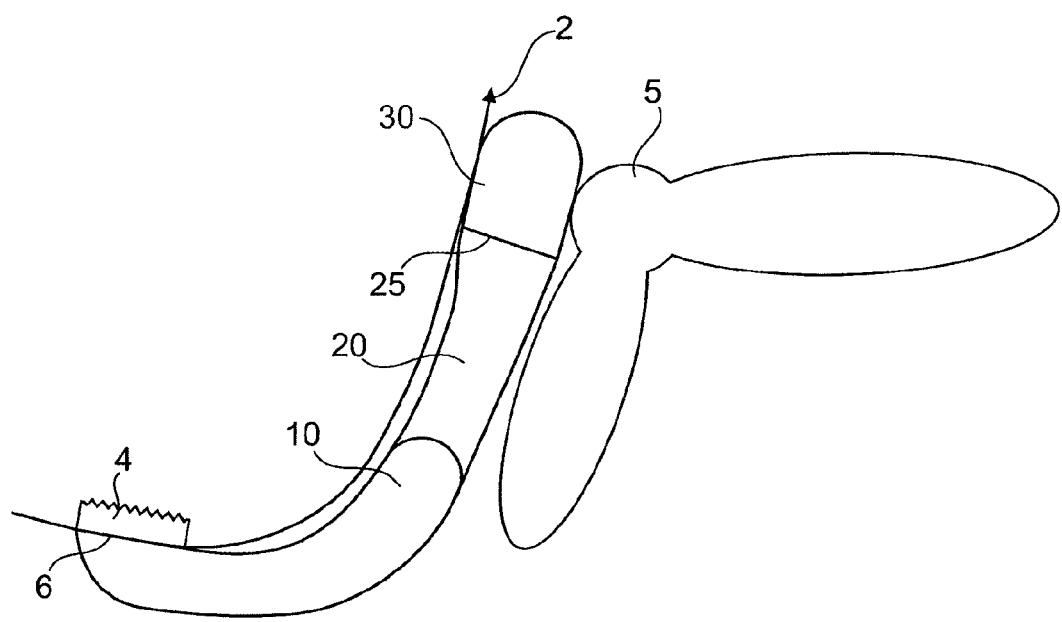
FIG. 1 is a schematic view of a knee airbag having three chambers.

FIG. 1 shows the basic configuration of a knee airbag which is arranged in an instrument panel 2 in the footwell. A gas generator 4 is provided with an outflow device directed into the footwell for deployment gas, which flows into a first chamber 10 through an inlet opening 6. The first chamber 10 primarily serves to position the remaining airbag region in front of the instrument panel 2 and keep it there in the inflated state, as shown in FIG. 1. Two further chambers 20, 30 are adjacent to the first chamber 10 in the flow direction, which further chambers 20, 30, are separated from each other by a dividing wall 25. Overflow openings are provided between the chambers 10, 20, and 30, through which overflow openings deployment gas can flow from the first chamber 10 into the second chamber 20, and from the second chamber 20 into the third chamber 30. As an alternative to the shown three-chamber configuration, it is possible that a two-chamber configuration of the knee airbag is provided; likewise, it is also possible to provide four or more consecutively arranged chambers. The occupant is positioned in front of the knee airbag, which occupant's knees 5 abut on the third chamber 30; the shin is positioned in front of the second chamber 20. The overflow opening between the second chamber 20 and the third chamber 30 can also be considered as the inlet opening 6, so that the second chamber 20 shown in the exemplary embodiment can be considered as the first chamber, and the second chamber 30 as the second chamber.

Figure 2A:
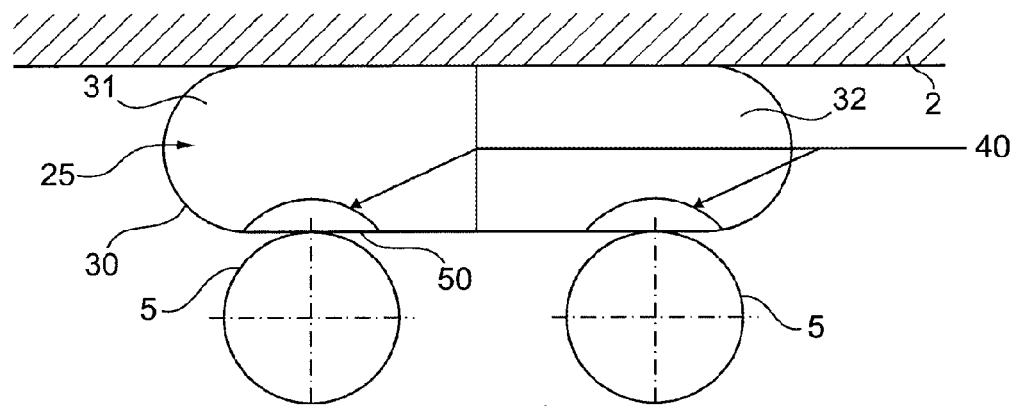
FIG. 2*a* is a sectional view perpendicular to the deployment direction with open overflow openings.

FIG. 2*a* is a cross-section perpendicular to the deployment direction of the knee airbag. The instrument panel 2 can also be seen, as well as the knees 5 positioned in front of the knee airbag. The upper, second chamber 30 is divided in two partial chambers 31, 32, which are each fluidically connected via an overflow opening 40 to the first chamber 20 located upstream in the flow direction. Each partial chamber 31, 32 is arranged in front of a knee 5; the partial chambers 31, 32 are separated from each other by a centrally arranged cut-off wall. The overflow openings 40 are configured as circular segment-like sections in the dividing wall 25 and allow deployment gas to flow unhindered into the upper chamber 30 or into the upper partial chambers 31, 32.

Figure 2B:
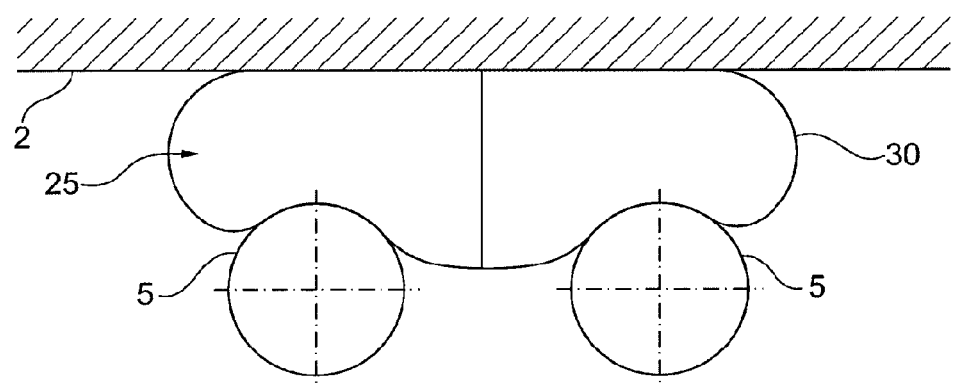
FIG. 2*b* is a view according to FIG. 2*a* with closed overflow openings.

FIG. 2*b* shows the position in which the knees 5 have penetrated into the airbag. The knees 5 have displaced the outer casing of the airbag in the penetration region of the knees 5 in the direction of the instrument panel 2, as a result of which the outer wall in the penetration region of the airbag gets into contact with the dividing wall 25 and closes the overflow openings 40. In the shown exemplary embodiment, the wall of the airbag in the penetration region of the knees 5 is configured as a closing device 50. The overflow openings 40 are reduced in size by the knees 5, the airbag wall closes the overflow openings 40 on penetration of the knees, so that there is a mechanical blocking of the overflow opening 40.

Figure 3A:
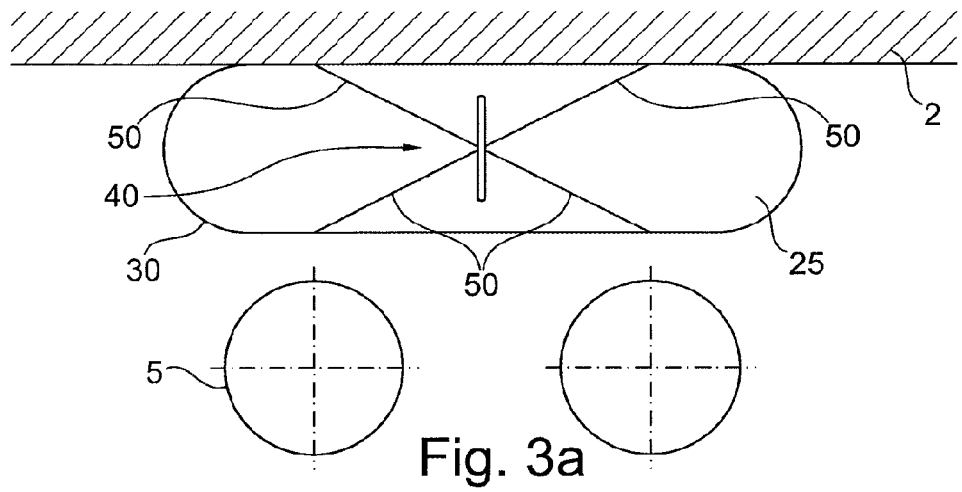
FIGS. 3*a* to 3*c* show a deployment sequence of a variant.
Figure 3B:
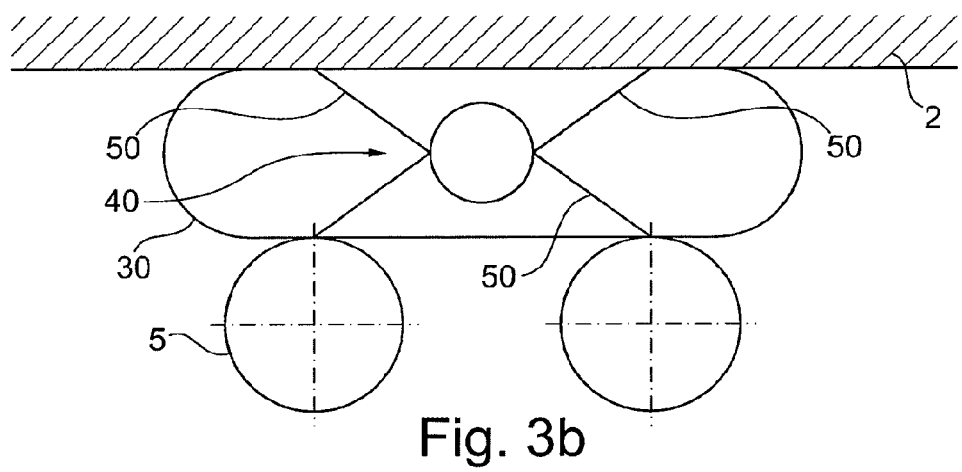
Figure 3C:
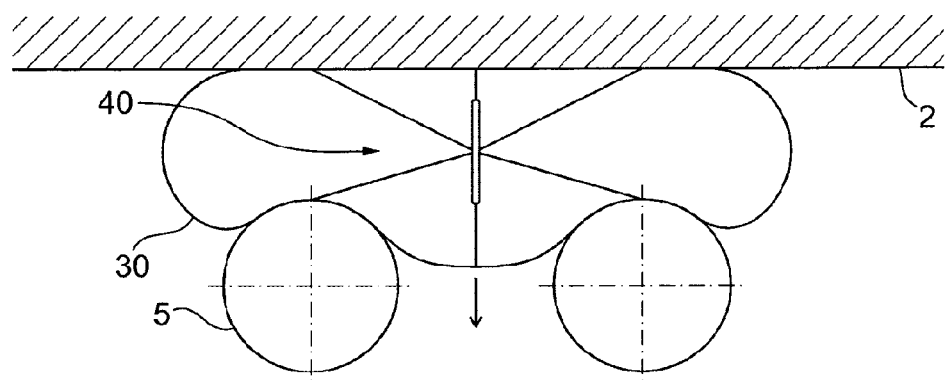

A variant of the invention is shown in FIGS. 3*a* to 3*c*, wherein the dividing wall 25 between the chambers 20, 30 has a central overflow opening 40, which is located in the center of the dividing wall 25. The overflow opening 40 is configured slot-shaped and opens in the course of the deployment of the airbag. In FIG. 3*a*, the knee airbag is shown in a not completely deployed state; the mutually opposing edges of the slot-shaped overflow opening 40 are only loosely held against each other and allow deployment gas to flow into the upper chamber 30 due to the still absent tension in the dividing wall 25. Four closing devices in the form of catch straps 50 are arranged as tensioning devices centrally on the dividing wall. The knees 5 are not yet in contact with the knee airbag in FIG. 3*a*.

In FIG. 3*b*, the knee airbag is shown in the completely deployed state; the catch straps 50 are arranged at the points of the outer wall of the airbag at which the knees 5 contact the knee airbag. The length of the catch straps 50 is dimensioned such that the slot-shaped overflow opening 40 is pulled apart so that a circular or approximately circular contour of the overflow opening 40 results. In the not completely deployed state, as shown in FIG. 3*a*, the catch straps 50 are fastened in the central region of the dividing wall 25 in the center of the overflow opening 40 such that on complete deployment and achievement of the complete circumference of the knee airbag, the mutually opposing edges of the slot-shaped overflow opening 40 are pulled apart.

In FIG. 3*c*, the knee airbag is shown after penetration of the knees 5. Due to the arrangement of the catch straps 50 in the region of the penetration point of the knees 5, the catch straps 50 are displaced in the direction of the articulation point in the area of the overflow opening 40; as a result of this, the tensioning effect is cancelled by the catch straps 50 located on the side of the occupants and the overflow opening 40 closes again, as shown in FIG. 3c. The closing effect is increased by the tensile force in the area between the knees 5, as indicated by the arrow.

Figure 4:
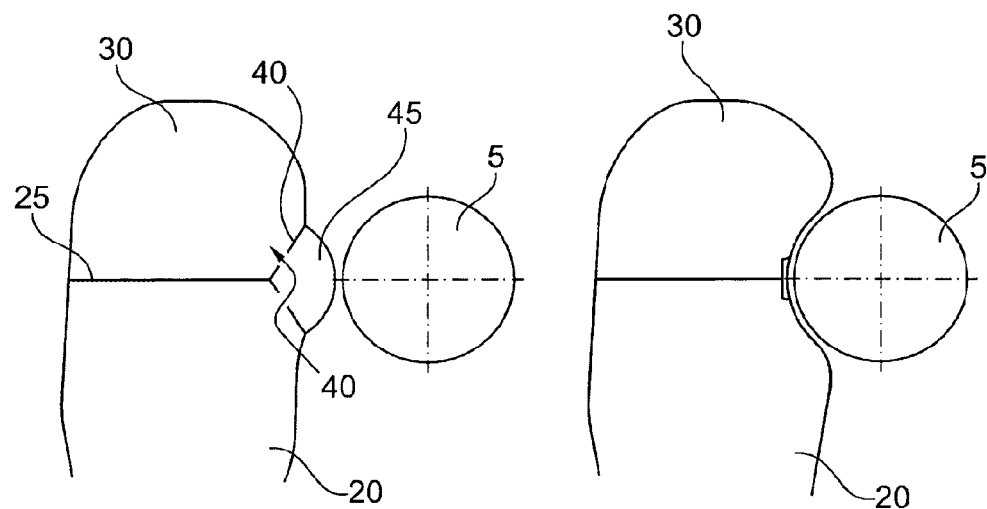
FIG. 4 is a vertical cross-sectional view of a variant.

FIG. 4 shows a longitudinal section of variant of the invention in which two walls branch off in a Y-shaped manner from the dividing wall 25, in which two walls an overflow opening 40 is respectively arranged. The deployment gas flows through this overflow opening 40 from the lower chamber 20 into the upper chamber 30 opposing the knees. A convexity is formed in the direction of the knees in the knee penetration region by the Y-shaped walls, which extend obliquely upward and downward, so that a forward bulging section 45 with overflow openings 40 is formed directly in the penetration region of the knees 5. In the left drawing, the knee 5 is not yet in contact with the airbag; in the right drawing, the knee 5 has displaced the section 45 in the direction of the dividing wall 25 and closed the overflow openings 40.

Figure 5:
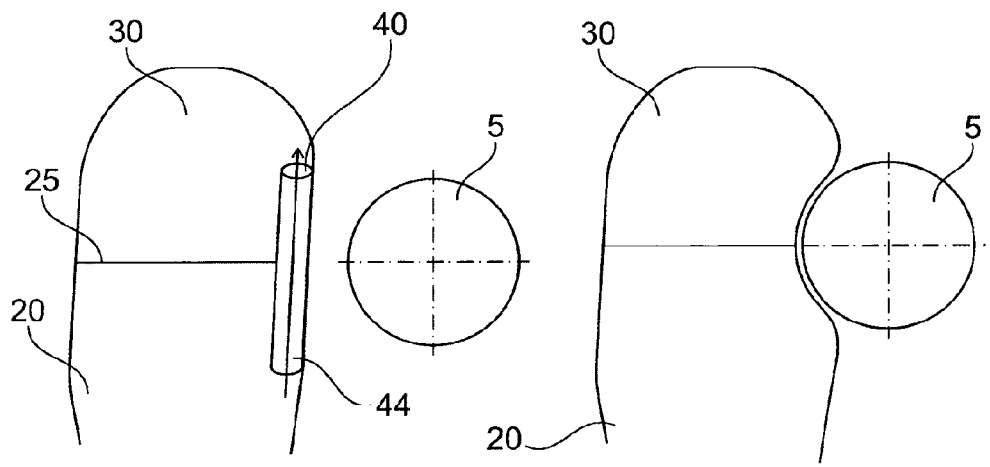
FIG. 5 shows a variant of FIG. 4.

FIG. 5 shows a variant in which instead of the section 45, an overflow tube 44 is provided for the conveyance of the deployment gas from the lower chamber 20 into the upper chamber 30. This overflow tube 44 is also arranged in the penetration region of the knees 5 and is closed as soon as the knees 5 press against the outer wall of the knee airbag.

While the above description constitutes the preferred embodiment of the present invention, it will be appreciated that the invention is susceptible to modification, variation and change without departing from the proper scope and fair meaning of the accompanying claims.

The invention claimed is:

1. A knee airbag for restraining an occupant knee comprising the airbag having an inflow opening for deployment gas from a gas generator for flowing into a first chamber, a second chamber which adjoins the first chamber and is separated from the first chamber by a separating wall, a closable overflow opening provided between the first chamber and the second chamber, through which the overflow opening for the deployment gas can flow from the first chamber into the second chamber, and a closing device for the overflow opening positioned to be controlled by the interaction of the occupant knee and an impingement region of the airbag such that until the occupant knee contacts the knee airbag, the overflow opening is open to allow the deployment gas to flow therethrough and the overflow opening becomes blocked when the occupant knee contacts and/or penetrates into the knee airbag.

2. A knee airbag according to claim 1, further comprising in that the closing device is configured as part of the second chamber of the airbag, and having at least one of a catch strap, a plurality of catch straps and a separating-wall leadthrough.

3. A knee airbag according to claim 1 further comprising a pair of the impingement regions for knees of the occupant controlling the closing device.

4. A knee airbag according to claim 1 further comprising in that the second chamber includes two partial chambers which are separated from one another and are connected to one another via the overflow opening.

5. A knee airbag according to claim 4 further comprising in that the closing device is in the form of a section with overflow openings or an overflow tube adapted to be closed by the occupant knee is arranged in a separating wall between the partial chambers in the impingement region of the knees.

6. A knee airbag according to claim 1 further comprising in that the first chamber is arranged below the second chamber.

7. A knee airbag according to claim 1 further comprising wherein the closing device restricting the flow of the deployment gas from the second chamber to the first chamber in the event that the occupant knee is interacting with the impingement region, and venting the deployment gas from the second chamber to the first chamber in the event that the occupant knee is not interacting with the impingement region.

8. A knee airbag according to claim 1 further comprising in that the second chamber forms first and second partial chambers which are separated from one another by the closing device in the form of first and second closing devices each associated with one of the first and the second partial chambers.

9. A knee airbag for restraining an occupant knee comprising the airbag having an inflow opening for deployment gas from a gas generator for flowing into a first chamber, a second chamber which adjoins the first chamber and is separated from the first chamber by a separating wall, a closable overflow opening provided between the first chamber and the second chamber, through which the overflow opening for the deployment gas can flow from the first chamber into the second chamber, and a closing device for the overflow opening positioned to be controlled by the interaction of the occupant knee and an impingement region of the airbag, wherein the closing device has at least one catch strap which opens the overflow opening in a filled, uninfluenced state of the knee airbag in which the knee of the occupant is not interacting with the impingement region.

10. A knee airbag for restraining an occupant knee comprising the airbag having an inflow opening for deployment gas from a gas generator for flowing into a first chamber, a second chamber which adjoins the first chamber and is separated from the first chamber by a separating wall, a closable overflow opening provided between the first chamber and the second chamber, through which the overflow opening for the deployment gas can flow from the first chamber into the second chamber, and a closing device for the overflow opening positioned to be controlled by the interaction of the occupant knee and an impingement region of the airbag, wherein the closing device has a first tensioning device which is under tension in a filled state of the knee airbag and holds the overflow opening open, and a second tensioning device which counteracts the first tensioning device connected to the overflow opening.

11. A knee airbag according to claim 10, further comprising in that the first and second tensioning devices are configured as catch straps.

* * * * *